US009752516B2

(12) United States Patent
Suzuki

(10) Patent No.: US 9,752,516 B2
(45) Date of Patent: Sep. 5, 2017

(54) CONTROL APPARATUS FOR VEHICLE

(71) Applicant: TOYOTA JIDOSHA KABUSHIKI KAISHA, Toyota-shi, Aichi-ken (JP)

(72) Inventor: Takashi Suzuki, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/066,336

(22) Filed: Mar. 10, 2016

(65) Prior Publication Data
US 2016/0273462 A1  Sep. 22, 2016

(30) Foreign Application Priority Data

Mar. 18, 2015 (JP) ................. 2015-054638

(51) Int. Cl.
*F02M 37/08* (2006.01)
*F02D 33/00* (2006.01)
(Continued)

(52) U.S. Cl.
CPC .......... *F02D 33/006* (2013.01); *B60H 1/004* (2013.01); *B60H 1/00428* (2013.01); *B60H 1/00735* (2013.01); *B60W 20/00* (2013.01); *F02D 1/08* (2013.01); *F02D 41/06* (2013.01); *F02D 41/064* (2013.01); *F02D 41/3082* (2013.01); *F02D 41/3836* (2013.01); *F02N 11/003* (2013.01); *F02N 11/0862* (2013.01);
(Continued)

(58) Field of Classification Search
CPC ........ F02D 33/006; F02D 1/08; F02D 41/064; F02D 41/3082; F02D 41/06; F02D 41/3836; F02D 41/3094; F02D 2041/3881; F02D 2001/082; F02D 2250/31; F02D 2250/02; F02D 2200/503; F02D 2200/0602; F02N 11/003; F02N 11/0862; F02N 19/00; B60H 1/00735; B60H 1/00428; B60H 1/004; B60W 20/00
USPC .......... 123/339.17, 446, 497, 510, 511, 491, 123/179.17; 701/103–105, 113
See application file for complete search history.

(56) References Cited

U.S. PATENT DOCUMENTS 7,830,108 B2 *  11/2010  Rumpf ................. H02J 7/0065
                                                          123/497
2003/0098009 A1   5/2003  Saito et al.

FOREIGN PATENT DOCUMENTS

EP    2 169 213 A2    3/2010
JP    2003-161224 A   6/2003
(Continued)

Primary Examiner — Hai Huynh
(74) Attorney, Agent, or Firm — Finnegan, Henderson, Farabow, Garrett & Dunner, LLP

(57) ABSTRACT

A control apparatus for a vehicle may include an engine, a fuel tank, a feed pump, a pressure sensor, a motor and an electric storage apparatus. The feed pump feeds the fuel to a port injection valve. The pressure sensor detects a fuel pressure that is fed to the port injection valve. The motor performs cranking of the engine at start time of the engine. The control apparatus includes an ECU. The ECU controls the feed pump based on a detection value of the pressure sensor and controls the motor in order to start the engine. The ECU controls the feed pump and the motor such that the electric storage apparatus feeds electric power to the motor in preference to the feed pump, when an electric power that the electric storage apparatus is able to output at the start time of the engine is less than a determination threshold.

5 Claims, 5 Drawing Sheets

(51) Int. Cl.
    *B60W 20/00*     (2016.01)
    *F02D 41/06*     (2006.01)
    *F02D 41/30*     (2006.01)
    *F02D 41/38*     (2006.01)
    *F02N 11/08*     (2006.01)
    *F02N 19/00*     (2010.01)
    *B60H 1/00*     (2006.01)
    *F02D 1/08*     (2006.01)
    *F02N 11/00*     (2006.01)

(52) U.S. Cl.
    CPC .......... *F02N 19/00* (2013.01); *F02D 41/3094* (2013.01); *F02D 2001/082* (2013.01); *F02D 2041/3881* (2013.01); *F02D 2200/0602* (2013.01); *F02D 2200/503* (2013.01); *F02D 2250/02* (2013.01); *F02D 2250/31* (2013.01)

(56) References Cited

FOREIGN PATENT DOCUMENTS

| | | |
|---|---|---|
| JP | 2005-155462 | 6/2005 |
| JP | 2005-299504 | 10/2005 |
| JP | 2008-251404 | 10/2008 |
| JP | 2010-077822 A | 4/2010 |

\* cited by examiner

CONTROL APPARATUS FOR VEHICLE

CROSS-REFERENCE TO RELATED APPLICATION

This application is based upon and claims the benefit of priority from Japanese Patent Application No. 2015-054638, filed on Mar. 18, 2015, which is incorporated herein by reference in its entirety.

TECHNICAL FIELD

The disclosure relates to a control apparatus for a vehicle.

BACKGROUND

Japanese Patent Application Publication No. 2005-299504 discloses that a hybrid vehicle equipped with an engine including a port injection valve and a cylinder injection valve, depending on auxiliary machines, preferentially performs the electric power feed to an electric fuel pump that feeds fuel to the cylinder injection valve at the time of automatic engine start.

SUMMARY

Even when electric power is fed while the electric fuel pump is prioritized over the auxiliary machines, it may be desired to feed electric power to a motor for performing the cranking of the engine, other than the fuel pump, at the engine start time. For example, the performance of a battery may markedly degrade at an extremely low temperature, and therefore, it is sometimes difficult for the battery to output enough electric power to drive both the electric fuel pump and the motor, at the time of cold start of the engine. In that case, even when the pressure of the fuel (hereinafter, referred to as fuel pressure) reaches a target value, the engine start may be difficult if it is not possible to secure electric power sufficient for the motor to perform the cranking of the engine.

The disclosure may provide a control apparatus for a vehicle in which the startability of the engine is enhanced.

An example aspect of the disclosure may provide a control apparatus for a vehicle. The vehicle may include an internal combustion engine, a fuel tank, an electric feed pump, a fuel pressure sensor, a motor, and an electric storage apparatus. The internal combustion engine may include a port injection valve. The port injection valve may be configured to inject fuel into an intake passage of the internal combustion engine. The fuel tank may store the fuel. The electric feed pump may be configured to suck the fuel from the fuel tank and feed the fuel to the port injection valve. The fuel pressure sensor may be configured to detect a pressure of the fuel that is fed to the port injection valve. The motor may be configured to perform cranking of the internal combustion engine at start time of the internal combustion engine. The electric storage apparatus may be configured to feed electric power to the electric feed pump and the motor. The control apparatus may include an electronic control unit. The electronic control unit may be configured to control the electric feed pump based on a detection value of the fuel pressure sensor. The electronic control unit may be configured to control the motor in order to start the internal combustion engine. The electronic control unit may be configured to control the electric feed pump and the motor such that the electric storage apparatus feeds electric power to the motor in preference to the electric feed pump, when a first electric power is less than a determination threshold, the first electric power being an electric power that the electric storage apparatus is able to output at the start time of the internal combustion engine.

The fuel pressure may be often set to a higher pressure than an ordinary value, for the promotion of the atomization of the fuel that is injected from the port injection valve, the actuation check of the fuel pressure sensor, or the like. When the fuel pressure is set to a high value, the consumed electric power of the electric feed pump may be increased. In such a situation, when the electric power that the electric storage apparatus may be able to output is restricted, the electric power sufficient for the motor to perform the cranking may not be obtained. When the normal cranking cannot be performed, the cylinder pressure may not rise to a pressure necessary for the first explosion, and the engine start may not be normally performed. Therefore, as described in the above control, each electric load may be controlled such that the electric storage apparatus feeds the electric power to the motor in preference to the feed pump. Thereby, the startability of the engine may be improved.

In the control apparatus, the electronic control unit may be configured to set the pressure of the fuel to a predetermined value when the first electric power is greater than the determination threshold. The electronic control unit may be configured to reduce the pressure of the fuel to less than the predetermined value when the first electric power is less than the determination threshold.

By performing the above control, when the electric power that the electric storage apparatus is able to output is restricted, it may be possible to reduce the consumed electric power of the feed pump by keeping the fuel pressure low, and to feed the electric power necessary for the cranking, to the motor, as much as possible.

In the control apparatus, the electronic control unit may be configured to restore the reduced pressure of the fuel to the predetermined value when a speed of the internal combustion engine becomes a target speed or greater.

When the speed of the internal combustion engine becomes the target speed or greater, the internal combustion engine itself may output power by isolated operation. In such a case, the cranking by the motor may be ended early, and a situation in which the internal combustion engine cannot be started is not brought even when the electric power shortage for the motor occurs. Hence, when the speed reaches the target value, the fuel pressure may be restored to the original value, and may be returned to a state appropriate for the operation of the internal combustion engine.

In the control apparatus, the electronic control unit may be configured to decide the electric power that is fed to the electric feed pump, based on a value resulting from subtracting a second electric power from the first electric power, the second electric power being an electric power required for the motor to start the internal combustion engine.

By deciding the distribution of the electric power as described above, it may be possible to secure, first, the electric power sufficient for the cranking, and to perform the injection from the port injection valve at a fuel pressure that is as close to the original target value as possible.

The vehicle may include an air conditioner. The air conditioner may receive the feed of electric power from the electric storage apparatus. In the control apparatus, the electronic control unit may be configured to stop the feed of electric power to the air conditioner when the first electric power is less than the determination threshold.

The air conditioner may be an electric load that is unlikely to produce a problem even when being temporarily stopped at the engine start time and that requires a large amount of consumed electric power. Therefore, by stopping the air conditioner when the electric power that the electric storage apparatus may be able to output is less than the determination threshold, it may be possible to feed the electric power sufficient at the engine start time, to the motor that performs the cranking.

According to the disclosure, when the electric power capable being fed from the electric storage apparatus is restricted, the electric power necessary for the cranking of the engine by the motor may be secured in preference to the drive of the fuel pump. Therefore, it may be possible to start the engine surely and quickly.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
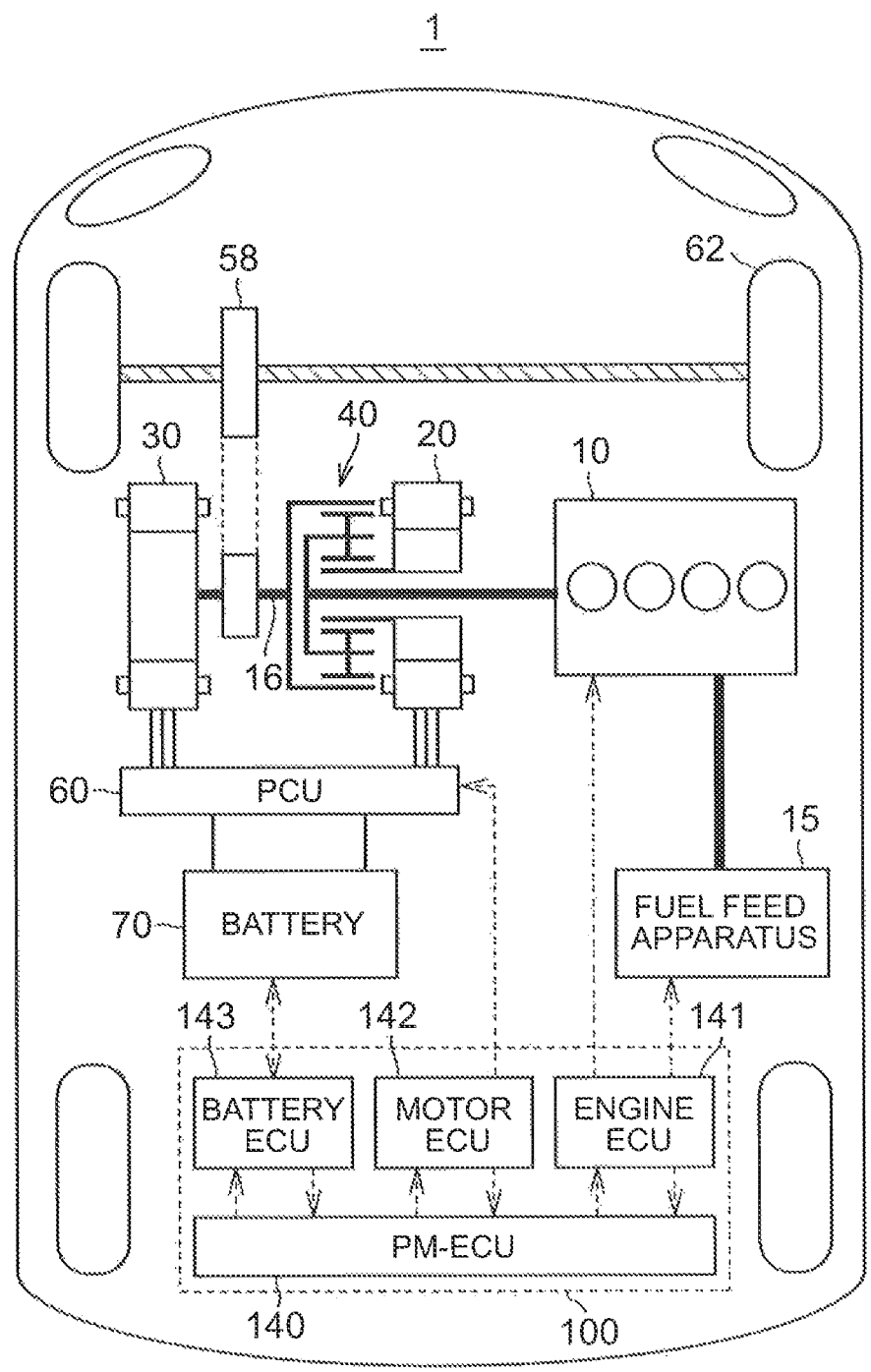
FIG. 1 is a block diagram showing a configuration of a hybrid vehicle 1 to which an embodiment is applied.

Hereinafter, an embodiment will be described in detail, with reference to the drawings. Here, in the drawings, for identical or equivalent parts, identical reference characters are assigned, and the descriptions are omitted.

FIG. 1 is a block diagram showing a configuration of a hybrid vehicle 1 to which the embodiment is applied. With reference to FIG. 1, the hybrid vehicle 1 includes an engine 10, a fuel feed apparatus 15, motor generators 20, 30, a dynamic power division mechanism 40, a reduction mechanism 58, drive wheels 62, a power control unit (PCU) 60, a battery 70, and a control apparatus 100.

The hybrid vehicle 1, which is a series/parallel hybrid vehicle, is configured to be capable of running by adopting at least one of the engine 10 and the motor generator 30 as a drive source.

The engine 10, the motor generator 20 and the motor generator 30 are mutually linked through the dynamic power division mechanism 40. The reduction mechanism 58 is connected with a rotation shaft 16 of the motor generator 30 that is linked to the dynamic power division mechanism 40. The rotation shaft 16 is linked to the drive wheels 62 through the reduction mechanism 58, and is linked to a crankshaft of the engine 10 through the dynamic power division mechanism 40.

The dynamic power division mechanism 40 can divide the drive force of the engine 10 to the motor generator 20 and the rotation shaft 16. The motor generator 20 rotates the crankshaft of the engine 10 through the dynamic power division mechanism 40, and thereby, can function as a starter that starts the engine 10.

The motor generators 20, 30 both are synchronous generator-motors that can be actuated as electric generators and as electric motors. The motor generators 20, 30 are connected with the PCU 60, and the PCU 60 is connected with the battery 70.

The control apparatus 100 includes a plurality of electronic control units. The plurality of electronic control units are an electronic control unit for power management (hereinafter, referred to as a PM-ECU) 140, an electronic control unit for the engine (hereinafter, referred to as an engine ECU) 141, an electronic control unit for the motors (hereinafter, referred to as a motor ECU) 142, and an electronic control unit for the battery (hereinafter, referred to as a battery ECU) 143. (Although control apparatus 100 includes the PM-ECU 140, the engine ECU 141, the motor ECU 142, and the battery ECU 143, it should be understood that alternative embodiments (not shown) may include a control apparatus having any number of electronic control units including a single electronic control unit.) Each control unit may be configured to perform disclosed functions. For example, each control unit may be programmed to perform disclosed functions. Control units may store or retrieve digitized instruction, which the control units may execute to perform disclosed functions. The digitized instructions may be stored in a non-transitory computer-readable medium.

The PM-ECU 140 is connected with the engine ECU 141, the motor ECU 142 and the battery ECU 143, through communication ports not illustrated. The PM-ECU 140 exchanges various control signals and data with the engine ECU 141, the motor ECU 142 and the battery ECU 143.

The motor ECU 142, which is connected with the PCU 60, controls the drive of the motor generators 20, 30. The battery ECU 143 computes the state of charge (SOC), based on an integrated value of charge/discharge current of the battery 70.

The engine ECU 141 is connected with the engine 10 and the fuel feed apparatus 15. The engine ECU 141, to which signals are input from various sensors for detecting the operation state of the engine 10, performs operation controls such as a fuel injection control, an ignition control and an intake air quantity regulation control, in response to the input signals. The engine ECU 141 controls the fuel feed apparatus 15 to feed fuel to the engine 10.

The configuration and control of the engine 10 and fuel feed apparatus 15 in the hybrid vehicle 1 having the above configuration will be described in more detail.

Figure 2:
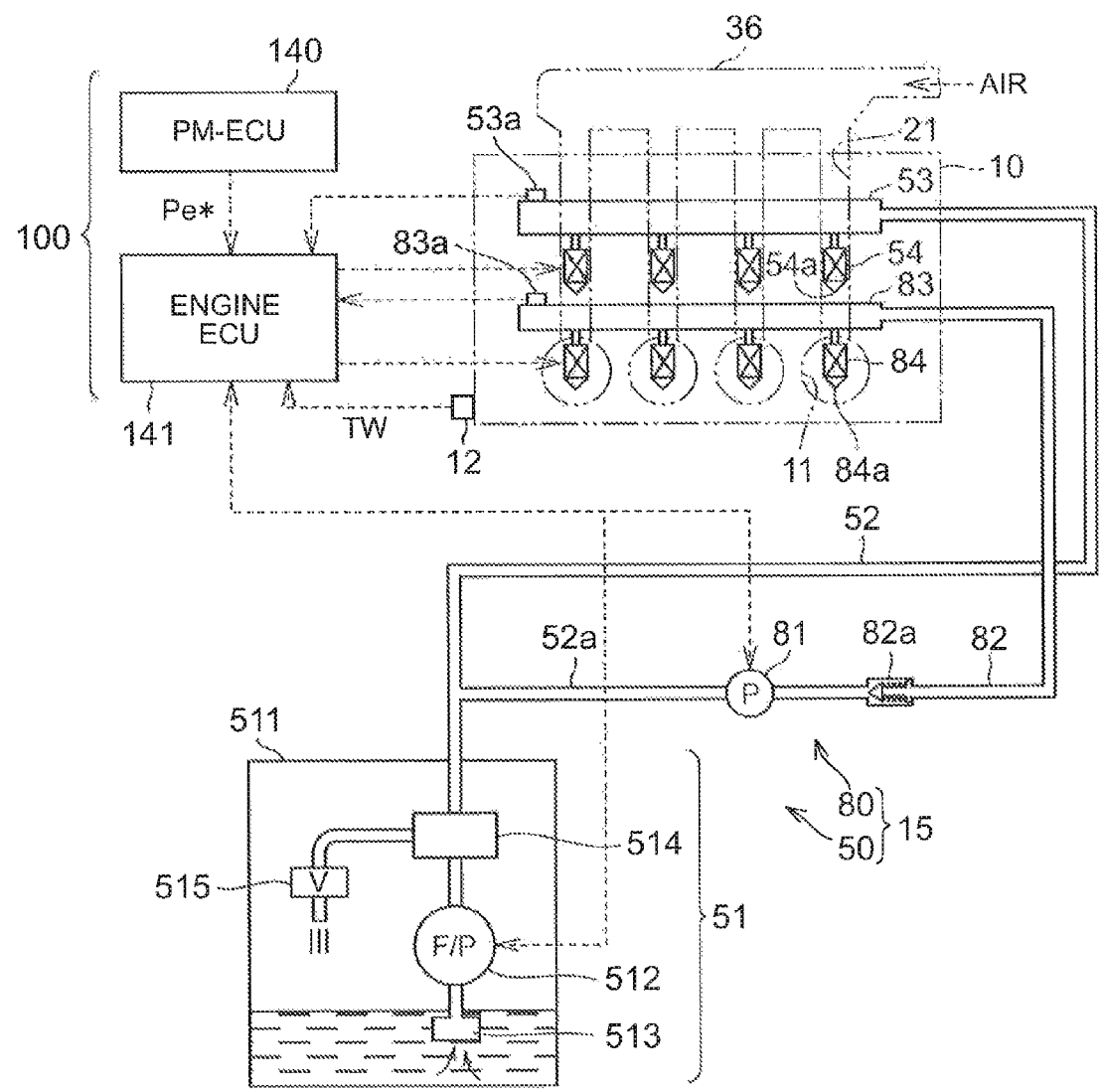
FIG. 2 is a diagram showing a fuel feed-related configuration of an engine 10 and a fuel feed apparatus 15 according to the embodiment.

FIG. 2 is a diagram showing a fuel feed-related configuration of the engine 10 and the fuel feed apparatus 15. The vehicle in the embodiment is a hybrid vehicle that employs, as an internal combustion engine, a dual injection type internal combustion engine using cylinder injection and port injection concurrently, for example, an in-line four-cylinder gasoline engine.

With reference to FIG. 2, the engine 10 includes an intake manifold 36, intake ports 21, four cylinders 11 provided in a cylinder block, and a coolant temperature sensor 12 that detects the coolant temperature of the coolant for cooling the cylinder block of the engine 10.

When non-illustrated pistons in the cylinders 11 travels down, intake air (AIR) flows from an intake pipe into the cylinders 11 through the intake manifold 36 and the intake ports 21.

The fuel feed apparatus 15 includes a low-pressure fuel feed mechanism 50 and a high-pressure fuel feed mechanism 80. The low-pressure fuel feed mechanism 50 includes a fuel pumping unit 51, a low-pressure fuel pipe 52, a low-pressure delivery pipe 53, a low-pressure fuel pressure sensor 53a, and port injection valves 54.

The high-pressure fuel feed mechanism 80 includes a high-pressure pump 81, a check valve 82a, a high-pressure fuel pipe 82, a high-pressure delivery pipe 83, a high-pressure fuel pressure sensor 83a, and cylinder injection valves 84.

The cylinder injection valve 84 is an injector for cylinder injection that exposes an injection hole 84a in a combustion chamber of the cylinder 11. When the cylinder injection valve 84 performs valve opening operation, the pressurized fuel in the high-pressure delivery pipe 83 is injected from the injection hole 84a of the cylinder injection valve 84 into the combustion chamber.

The engine ECU 141 includes a central processing unit (CPU), a read only memory (ROM), a random access memory (RAM), an input interface circuit, an output interface circuit and the like. The engine ECU 141 receives an engine start/stop command from the PM-ECU 140 in FIG. 1, to control the engine 10 and the fuel feed apparatus 15.

The engine ECU 141 calculates a necessary fuel injection quantity for each combustion, based on accelerator position, intake air quantity, engine speed and the like. Further, based on the calculated fuel injection quantity, the engine ECU 141 outputs an injection command signal and the like to the port injection valves 54 and the cylinder injection valves 84, in a timely manner.

At the start time of the engine 10, the engine ECU 141, initially, performs the fuel injection by the port injection valves 54. Then, when the fuel pressure in the high-pressure delivery pipe 83 detected by the high-pressure fuel pressure sensor 83a exceeds a previously set pressure value, the engine ECU 141 starts the output of the injection command signal to the cylinder injection valves 84.

Moreover, for example, the engine ECU 141 basically performs the cylinder injection from the cylinder injection valves 84, and therewith, concurrently performs the port injection, under particular operation states in which air-fuel mixture formation is insufficient by cylinder injection, for example, at the time of start warm-up of the engine 10 and at the time of a low speed and a high load. Further, for example, the engine ECU 141 basically performs the cylinder injection from the cylinder injection valves 84, and therewith, executes the port injection from the port injection valves 54, when the port injection is effective, for example, at the time of a high speed and a low load.

The embodiment is characterized in that the fuel feed apparatus 15 can be controlled such that the pressure of the low-pressure fuel feed mechanism 50 is variable. Hereinafter, the low-pressure fuel feed mechanism 50 of the fuel feed apparatus 15 will be described in more detail.

The fuel pumping unit 51 includes a fuel tank 511, a feed pump 512, a suction filter 513, a fuel filter 514, and a relief valve 515.

In the fuel tank 511, the fuel to be consumed in the engine 10, for example, gasoline is stored. The suction filter 513 blocks the suction of foreign substances. The fuel filter 514 removes foreign substances in discharge fuel.

The relief valve 515 is opened when the pressure of the fuel to be discharged from the feed pump 512 reaches an upper limit pressure, and the valve-closed state is maintained while the pressure of the fuel is less than the upper limit pressure.

The low-pressure fuel pipe 52 is linked from the fuel pumping unit 51 to the low-pressure delivery pipe 53. However, the low-pressure fuel pipe 52 is not limited to a fuel pipe, and may be a single member in which a fuel passage is formed so as to penetrate, or a plurality of members in which a fuel passage is formed therebetween.

The low-pressure delivery pipe 53 is connected with the low-pressure fuel pipe 52, on one end side of the tandem arrangement direction of the cylinders 11. To the low-pressure delivery pipe 53, the port injection valves 54 are linked. To the low-pressure delivery pipe 53, the low-pressure fuel pressure sensor 53a to detect the fuel pressure in the interior is attached.

The port injection valve 54 is an injector for port injection that exposes an injection hole 54a in the intake port 21 of the corresponding cylinder 11. When the port injection valve 54 performs valve opening operation, the pressurized fuel in the low-pressure delivery pipe 53 is injected from the injection hole 54a of the port injection valve 54 into the intake port 21.

The feed pump 512 is driven and stopped based on command signals that are transmitted from the engine ECU 141.

The feed pump 512 can pump up the fuel from the fuel tank 511, and can pressurize the pumped-up fuel to a pressure in a certain variable range of, for example, less than 1 [MPa], to discharge the fuel. Furthermore, the feed pump 512 can change the discharge rate [m$^3$/sec] and discharge pressure [kPa] per unit time, by the control from the engine ECU 141.

Such a control of the feed pump 512 is preferable in the following respects. First, in the low-pressure delivery pipe 53, for preventing the vaporization of the fuel in the interior due to the increase in the temperature of the engine, it is necessary to apply a pressure enough to keep the fuel from vaporizing. However, when the pressure is too high, the load of the pump increases and the energy loss increases. The pressure for preventing the vaporization of the fuel varies depending on the temperature, and therefore, it is possible to reduce the energy loss by applying a necessary pressure to the low-pressure delivery pipe 53. Further, when a quantity of fuel equivalent to a quantity consumed by the engine is delivered by an appropriate control of the feed pump 512, it is possible to save the energy for an inefficient pressurization. Therefore, there is an advantage in that the fuel efficiency is improved compared to a configuration in which the pressure is regulated to a certain value by a pressure regulator after the pressurization is excessively performed once.

Figure 3:
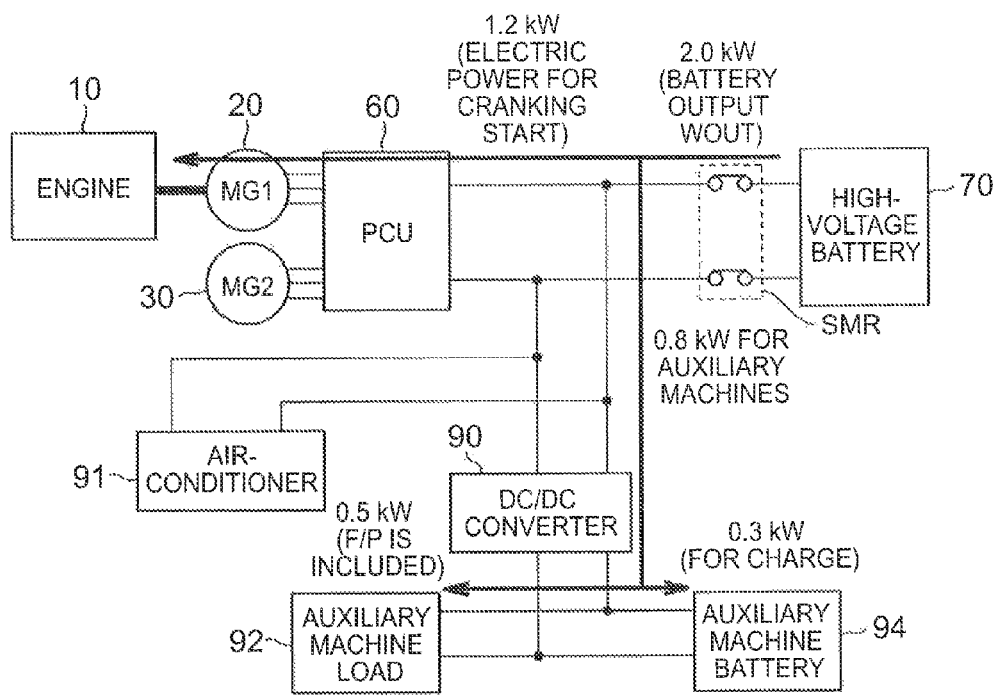
FIG. 3 is a block diagram for describing an electric power system of the hybrid vehicle 1 according to the embodiment.

FIG. 3 is a block diagram for describing an electric power system of the hybrid vehicle 1. With reference to FIG. 3, electric power is fed from the battery 70 to the PCU 60 and a DC/DC converter 90 for feeding electric power to an auxiliary machine system, through a system main relay SMR. The PCU 60 drives the motor generators 20, 30, and the DC/DC converter 90 feeds the electric power to an auxiliary machine battery 94 and an auxiliary machine load 92. The auxiliary machine load 92 includes the feed pump 512 in FIG. 2.

Figure 4:
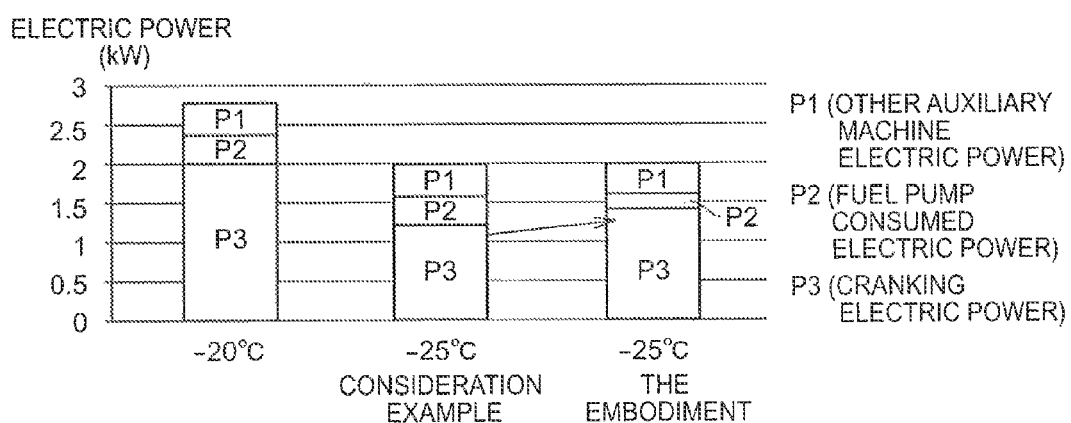
FIG. 4 is a diagram for describing an exemplary breakdown of electric power consumption at engine cranking time according to the embodiment.

FIG. 4 is a diagram for describing an exemplary breakdown of the electric power consumption at the engine cranking time. In FIG. 4, the ordinate indicates electric power (kW), and cases of temperatures of −20° C., −25° C. (consideration example) and −25° C. (an embodiment) are shown in order from the left.

With reference to FIG. 3 and FIG. 4, the case of −25° C. (consideration example) will be described. The battery output from the battery 70 (hereinafter, also referred as the high-voltage battery 70) is, for example, 2.0 kW. This is an upper limit decided by an electric power output upper limit (WOUT) that is determined by the battery temperature and the like. In the battery output, the cranking electric power is 1.2 kW as shown by P3 in FIG. 4, and the consumed electric power P1 for the auxiliary machines is 0.8 kW. As for the breakdown of the consumed electric power 0.8 kW for the auxiliary machines, the consumed electric power for the auxiliary machine load including the feed pump 512 is 0.5 kW, and the electric power for the charge of the auxiliary machine battery 94 is 0.3 kW. Here, in the distribution of the electric power, it is assumed that an air-conditioner (an example of the air conditioner) 91 is in an operation stop state.

In the case of −20° C., the electric power of the battery is, for example, 2.7 kW. As compared to this, in the case of −25° C. (consideration example), the electric power of the battery is reduced to 2.0 kW. In this situation, the auxiliary machine electric power P1 and a fuel pump consumed electric power P2 are secured by quantities equivalent to those in the case of −20° C., and as a result, in the case of −25° C. (consideration example), the cranking electric power P3 is significantly reduced compared to the case of −20° C.

Under this circumstance, even when the feed pump 512 feeds the atomized fuel, the motor generator 20 cannot output the torque for revolving the engine, and it may be difficult to start the engine.

Particularly, in hybrid cars, the cylinder pressure necessary for the first explosion of the engine is approximately 0.8 MPa, and for securing the cylinder pressure, it is required to raise the speed at the cranking time to some extent. At a low temperature, the performance of lubricant in the engine degrades, and therefore, the friction at the start time increases, so that the motor generator 20 tends to require a greater electric power at the cranking time.

Hence, as shown in −25° C. (an embodiment), in the embodiment, the fuel pump consumed electric power P2 is decreased relative to the case of −20° C. by the reduction in the target fuel pressure, and by that quantity, the cranking electric power P3 is increased.

That is, in the embodiment, a lower target fuel pressure is set as the electric power output upper limit (WOUT) is lower. Thereby, the consumed electric power of the feed pump 512 is reduced. By such a control, the electric power of the battery is used for the cranking of the engine, in preference to the fuel atomization by the increase in the fuel pressure. For the change in the injection quantity due to the decrease in the fuel pressure, the regulation can be performed by the increase in the valve opening time of the injection valve.

Here, the index for changing the target fuel pressure is not limited to the electric power output upper limit (WOUT). For example, a lower target fuel pressure may be set as the state of charge (SOC) of the battery or the battery temperature is lower.

Figure 5:
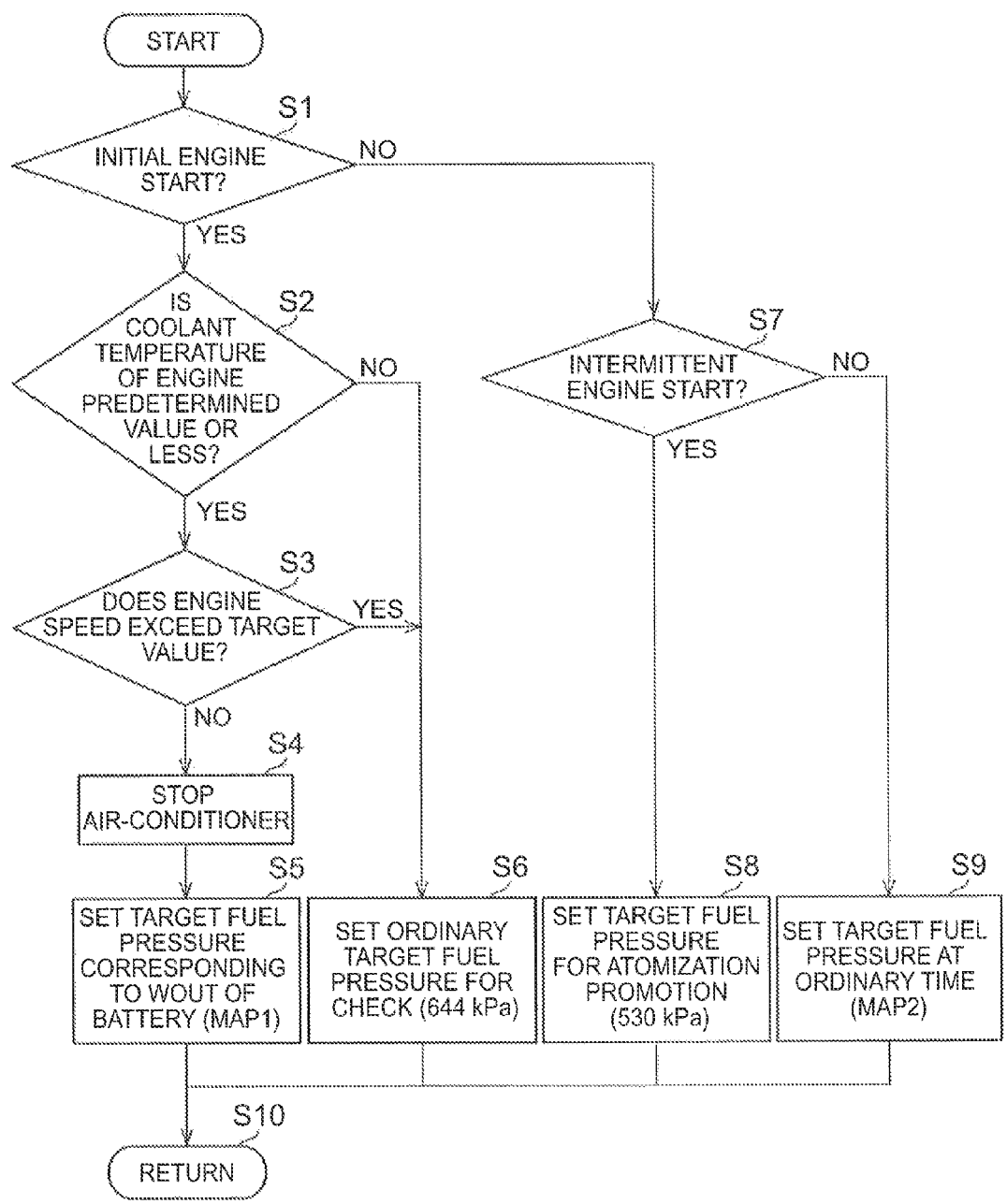
FIG. 5 is a flowchart for describing the setting of a target fuel pressure according to the embodiment.

FIG. 5 is a flowchart for describing the setting of the target fuel pressure that is executed in the embodiment. The flowchart shown in FIG. 5 is called by a main routine and is executed, at regular time intervals, or whenever a predetermined condition is satisfied.

With reference to FIG. 2 and FIG. 5, firstly, in step S1, the engine ECU 141 determines whether the current engine control state is the initial start of the engine (the first start after the time point of the operation start). This is because the engine ECU 141 checks the fuel pressure sensor 53a once during a time period (hereinafter, referred to as one trip) after the time point of the operation start and before the time point of the operation end and the check timing is ordinarily the time of the first engine start.

For example, the engine ECU 141 counts the number N of engine starts during the one trip and resets the number N of starts at the time of the one trip end. In such a case, the engine ECU 141 may make the determination of being the initial start, when the number N of starts is zero. Further, for example, the engine ECU 141 sets a flag F indicating the initial start during the one trip, at the time point of the operation start, and clears the flag F at the time of the initial start completion or at the time of the second start condition satisfaction. Thereby, the engine ECU 141 may determine, by the flag, whether the current engine control state is the initial start.

In the case where it is determined that the current engine control state is the initial start of the engine in step S1 (YES in S1), the process proceeds to step S2, and in the case where it is not determined that the current engine control state is the initial start (NO in S1), the process proceeds to step S7.

In step S2, whether a coolant temperature Tw of the coolant in the engine 10 is a predetermined value or less is determined. The engine ECU 141 receives the coolant temperature Tw from the coolant temperature sensor 12 to make the determination. If the coolant temperature Tw is the predetermined value or less in step S2 (YES in S2), the process proceeds to step S3, and if the coolant temperature Tw is the predetermined value or greater (NO in S2), the process proceeds to step S6.

In step S3, whether a speed Ne of the engine 10 exceeds a target value is determined. After the engine 10 obtains a speed enough to perform isolated operation, the motor generator 20 does not need to continue the cranking. Accordingly, even when the electric power consumption by the feed pump 512 causes the shortage of the electric power for the motor generator 20, there is no problem. Therefore, in the case where the speed Ne of the engine 10 exceeds the target value in step S3 (YES in S3), the process proceeds to step S6.

On the other hand, in the case where the speed Ne of the engine 10 does not exceed the target value in step S3 (NO in S3), there is a possibility of the shortage of the electric power for driving the motor generator 20, and therefore, the process proceeds to step S4. In step S4, the air-conditioner 91 is stopped for a short period during which the initial start of the engine is performed. Other auxiliary machines (devices that may be temporarily stopped, for example, an audio device) may be stopped, instead of the air-conditioner 91 or in addition to the air-conditioner 91.

When the process of step S4 is completed, the process proceeds to step S5. In step S5, the engine ECU 141 sets a target fuel pressure, based on the electric power output upper limit (WOUT) of the battery 70 obtained through the battery ECU 143 and the PM-ECU 140 in FIG. 1. For example, it is possible to set the target fuel pressure using the following map MAP1.

Figure 6:
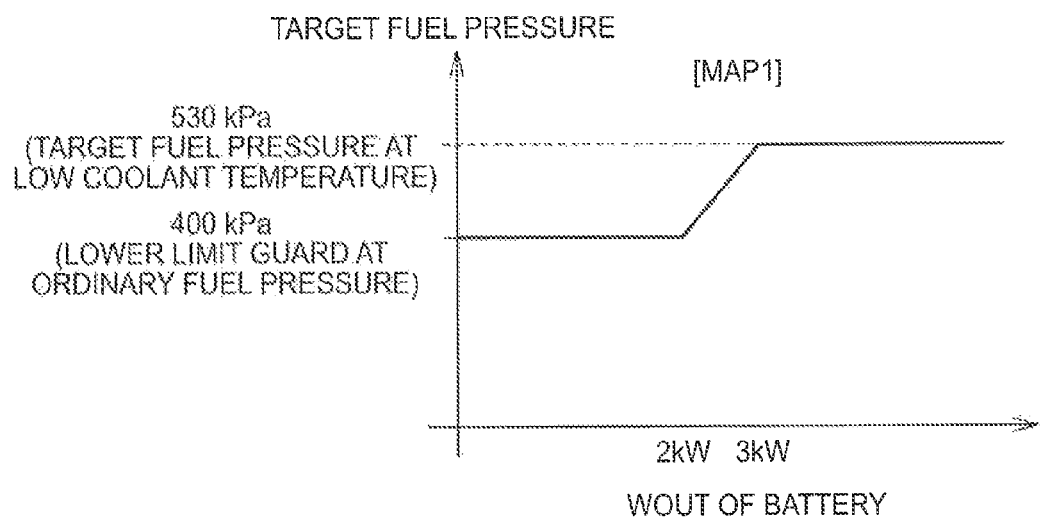
FIG. 6 is a diagram showing an exemplary map that shows the target fuel pressure corresponding to an electric power output upper limit (WOUT) of a battery according to the embodiment.

FIG. 6 is a diagram showing an exemplary map that shows the target fuel pressure corresponding to the electric power output upper limit (WOUT) of the battery. With reference to FIG. 6, the map MAP1 is a map for setting the target fuel pressure indicated by the ordinate with respect to the electric power output upper limit (WOUT) of the battery 70 indicated by the abscissa.

For example, if the electric power output upper limit (WOUT) is 3 kW or greater, the target fuel pressure is set to 530 kPa. The 530 kPa is a target fuel pressure that is ordinarily used at low coolant temperatures.

Meanwhile, if the electric power output upper limit (WOUT) is greater than 2 kW and less than 3 kW, a lower target fuel pressure is set as the electric power output upper limit (WOUT) is lower. Then, in the case of the electric power output upper limit (WOUT) being 2 kW, the target fuel pressure is reduced to 400 kPa, which is a lower limit guard value. If the electric power output upper limit (WOUT) is 2 kW or less, the target fuel pressure is set to 400 kPa. The 400 kPa, which is a lower limit guard value, is a target fuel pressure that is ordinarily used at running time.

In step S5 of FIG. 5, the map MAP1 can be used. On the other hand, in the case where the coolant temperature of the engine is higher than the predetermined value in step S2 (NO in S2), or in the case where the engine speed Ne exceeds the target value in step S3 (YES in S3), the process proceeds to step S6. In step S6, the target fuel pressure is set to an ordinary fuel pressure (644 kPa) for the check of the fuel pressure sensor. In this case, the check of the fuel pressure sensor 53a is executed concurrently. In the check, as an example, a process of confirming that the fuel pressure sensor 53a is normal is performed by confirming that the fuel pressure sensor 53a detects a value (644 kPa) near the valve opening pressure of the relief valve 515.

Next, the case where the process proceeds from step S1 to step S7 will be described. In step S7, the engine ECU 141 determines whether the current engine control state is an intermittent start of the engine 10.

For example, in the case where the vehicle speed exceeds a predetermined value, a driver requests acceleration by operating an accelerator pedal or the SOC of the battery 70 decreases in a state (EV running state) in which the hybrid vehicle 1 stops the operation of the engine 10 and runs using the motor generator 30, the hybrid vehicle 1 transitions from the EV running state to a state (HV running state) of running along with the operation of the engine 10. The start of the engine 10 on this occasion falls under the intermittent start.

When the vehicle temporarily stops because of, for example, the red traffic signal or the like after the initial start, the engine 10 is also stopped if the SOC of the battery 70 is sufficient. Thereafter, when the red traffic signal is changed to the green traffic signal and the vehicle starts to move, the stopped engine 10 is sometimes started. The start of the engine 10 on this occasion also falls under the intermittent start.

If the current engine control state is the intermittent engine start in step S7 (YES in S7), the process proceeds to step S8. In the case of the intermittent engine start, the intake passage of the engine is colder than that in the case of a continuous engine operation, and the fuel injected from the port injection valve 54 easily adheres to the intake passage. Therefore, in step S8, for the atomization promotion of the fuel, the target fuel pressure is set to a higher fuel pressure (530 kPa) than that at the ordinary operation time.

On the other hand, if the current engine control state is not the intermittent engine start in step S7 (NO in S7), the process proceeds to step S9. In the case of being not the intermittent engine start, the current engine control state, for example, is the continuous engine operation, and the intake passage of the engine is sufficiently warmed. Therefore, in many cases, it is not necessary to consider that the fuel injected from the port injection valve 54 adheres to the intake passage. Therefore, in step S8, the engine ECU 141 sets the target fuel pressure to a fuel pressure that is used at the ordinary operation time. In the setting of the target fuel pressure, the following map for setting the target fuel pressure based on the coolant temperature is used.

Figure 7:
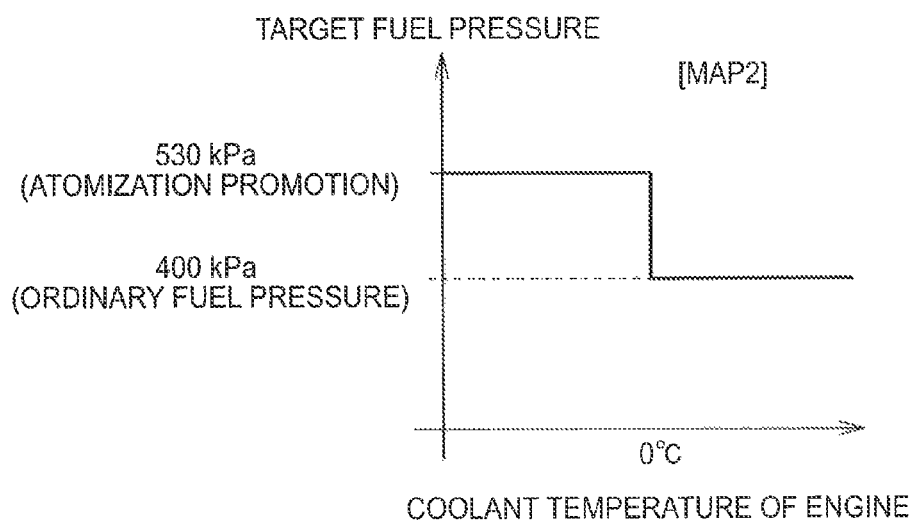
FIG. 7 is a diagram showing an exemplary map that shows the target fuel pressure corresponding to coolant temperature of the engine according to the embodiment.

FIG. 7 is a diagram showing an exemplary map that shows the target fuel pressure corresponding to the coolant temperature of the engine. With reference to FIG. 7, a map MAP2 is a map for setting the target fuel pressure indicated by the ordinate with respect to the coolant temperature Tw of the engine indicated by the abscissa.

As shown in FIG. 7, in the case where the coolant temperature of the engine is 0° C. or greater, the target fuel pressure is set to 400 kPa, and in the case where the coolant temperature of the engine is less than 0° C., the target fuel pressure, for atomization promotion, is set to 530 kPa, which is greater than that at the ordinary time.

Here, as the input for the map, a temperature other than the coolant temperature of the engine may be adopted, if the temperature is a temperature that varies in association with the temperature of the engine. For example, the temperature of engine oil or the like may be adopted.

After the target fuel pressure is set by either process of the above steps S5, S6, S8 and S9, the control is returned to the main routine in step S10.

The embodiment will be summarized with reference to the drawings. With reference to FIG. 2 and FIG. 3, the hybrid vehicle 1 includes the engine 10 including the port injection valve 54 that injects the fuel into the intake passage, the fuel tank 511 in which the fuel for the injection from the port injection valve 54 is stored, the electric feed pump 512 that sucks the fuel from the fuel tank 511 and feeds the fuel to the port injection valve 54, the low-pressure fuel pressure sensor 53a that detects the pressure of the fuel that is fed to the port injection valve 54, the motor generator 20 that performs the cranking of the engine at the engine start time, and the high-voltage battery 70 that feeds electric power to the feed pump 512 and the motor generator 20. The control apparatus for the vehicle according to the embodiment includes the engine ECU 141 that controls the feed pump 512 based on the detection value of the low-pressure fuel pressure sensor 53a and that controls the motor generator 20 in order to start the engine 10. The engine ECU 141 controls the feed pump 512 and the motor generator 20 such that the high-voltage battery 70 feeds the electric power to the motor generator 20 in preference to the feed pump, when the electric power that the high-voltage battery 70 is able to output at the engine start time is less than a determination threshold.

The fuel pressure is often set to a higher pressure than an ordinary value, for the promotion of the atomization of the fuel that is injected from the port injection valve 54 or for the actuation check of the low-pressure fuel pressure sensor 53a. When the fuel pressure is raised, the consumed electric power of the feed pump 512 is increased. In such a situation, when the electric power that the high-voltage battery 70 is able to output is restricted, the electric power necessary for the motor generator 20 to perform the cranking is sometimes not obtained. When the normal cranking cannot be performed, the cylinder pressure does not rise to a pressure necessary for the first explosion, and the engine start cannot be normally performed. Therefore, as described in the above control, each electric load is controlled such that the high-voltage battery 70 feeds the electric power to the motor generator 20 in preference to the feed pump 512. Thereby, the startability of the engine 10 is improved.

Preferably, for example, as shown in the map of FIG. 6, the engine ECU 141 should set the pressure of the fuel to a predetermined value (530 kPa) when the electric power that the high-voltage battery 70 is able to output is greater than the determination threshold (3 kW), and should reduce the pressure of the fuel to less than the predetermined value (530 kPa) when the electric power that the high-voltage battery 70 is able to output is less than the determination threshold (3 kW).

By performing the above control, when the electric power that the high-voltage battery 70 is able to output is restricted, it is possible to reduce the consumed electric power of the feed pump 512 by keeping the fuel pressure low, and to feed the electric power necessary for the cranking, to the motor generator 20, as much as possible.

More preferably, the engine ECU 141 should restore the reduced pressure of the fuel to the predetermined value, when the speed of the engine 10 becomes a target speed or greater (YES in S3 of FIG. 5).

When the speed of the engine 10 becomes the target speed or greater, the engine 10 itself can output power by isolated operation. In such a case, the cranking by the motor generator 20 may be ended early, and a situation in which the engine 10 cannot be started is not brought even when the electric power shortage for the motor generator 20 occurs. Hence, when the speed reaches the target value, the fuel pressure is restored to the original value, and is returned to a state appropriate for the operation of the engine 10.

Preferably, as shown in FIG. 4, the engine ECU 141 should decide the electric power that is fed to the feed pump 512, based on the value resulting from subtracting the electric power P3 necessary for the motor generator 20 to start the engine 10 from the electric power (electric power output upper limit) WOUT that the high-voltage battery 70 is able to output.

By deciding the distribution of the electric power as described above, it is possible to secure, first, the electric power P3 necessary for the cranking, and to perform the injection from the port injection valve 54 at a fuel pressure that is as close to the original target value as possible.

Preferably, the hybrid vehicle 1 should further include the air-conditioner 91 (FIG. 3) that receives the feed of the electric power from the high-voltage battery 70. The engine ECU 141, in FIG. 5, stops the air-conditioner 91 when the speed of the engine does not exceed the predetermined value, but the engine ECU 141 may stop the feed of the electric power to the air-conditioner 91 when the electric power WOUT that the high-voltage battery 70 is able to output is less than the determination threshold.

The air-conditioner 91 is an electric load that is unlikely to produce a problem even when being temporarily stopped at the engine start time and that requires a large amount of consumed electric power. Therefore, by stopping the air-conditioner 91 when the electric power that the high-voltage battery 70 is able to output is less than the determination threshold, it is possible to feed the electric power necessary at the engine start time, to the motor generator 20 that performs the cranking.

It should be understood that the embodiments disclosed herein are examples and are not limiting in all respects. It is intended that the scope of the disclosure is not limited by the above description, and includes all modifications.

What is claimed is:

1. A control apparatus for a vehicle, the vehicle including:
    an internal combustion engine including a port injection valve, the port injection valve being configured to inject fuel into an intake passage of the internal combustion engine;
    a fuel tank for storing the fuel;
    an electric feed pump configured to suck the fuel from the fuel tank and feed the fuel to the port injection valve;
    a fuel pressure sensor configured to detect a pressure of the fuel that is fed to the port injection valve;
    a motor configured to perform cranking of the internal combustion engine at a start time of the internal combustion engine; and
    an electric storage apparatus configured to feed electric power to the electric feed pump and the motor,
    the control apparatus comprising
        at least one electronic control unit programmed to:
            control the electric feed pump based on a detection value of the fuel pressure sensor;
            control the motor in order to start the internal combustion engine; and
            control the electric feed pump and the motor to cause the electric storage apparatus to feed electric power to the motor in preference to the electric feed pump, when a first electric power is less than a determination threshold, the first electric power being an electric power that the electric storage apparatus is able to output at the start time of the internal combustion engine.

2. The control apparatus according to claim 1, wherein the electronic control unit is further programmed to set the pressure of the fuel to a predetermined value when the first electric power is greater than the determination threshold, and
    the electronic control unit is further programmed to reduce the pressure of the fuel to less than the predetermined value when the first electric power is less than the determination threshold.

3. The control apparatus according to claim 2, wherein the electronic control unit is further programmed to restore the reduced pressure of the fuel to the predetermined value when a speed of the internal combustion engine becomes a target speed or greater.

4. The control apparatus according to claim 1, wherein the electronic control unit is further programmed to decide the electric power that is fed to the electric feed pump, based on a value resulting from subtracting a second electric power from the first electric power, the second electric power being an electric power required for the motor to start the internal combustion engine.

5. The control apparatus according to claim 1, wherein
    the vehicle includes an air conditioner, wherein the air conditioner receives the feed of electric power from the electric storage apparatus, and
    the electronic control unit is further programmed to stop the feed of electric power to the air conditioner when the first electric power is less than the determination threshold.

* * * * *